US012665404B2

(12) United States Patent
Zbriger et al.

(10) Patent No.: US 12,665,404 B2
(45) Date of Patent: Jun. 23, 2026

(54) WATERTIGHT BOX AND ADAPTER

(71) Applicant: HUBBELL INCORPORATED, Shelton, CT (US)

(72) Inventors: Michael Jay Zbriger, Seymour, CT (US); Joseph Nicholas Cretella, Ansonia, CT (US); Roy Joseph Itzler, Orange, CT (US); Joseph Anthony DiMaria, Waterbury, CT (US)

(73) Assignee: HUBBELL INCORPORATED, Shelton, CT (US)

( * ) Notice: Subject to any disclaimer, the term of this patent is extended or adjusted under 35 U.S.C. 154(b) by 100 days.

(21) Appl. No.: 18/480,940

(22) Filed: Oct. 4, 2023

(65) Prior Publication Data

US 2024/0030690 A1     Jan. 25, 2024

Related U.S. Application Data

(63) Continuation of application No. 16/781,679, filed on Feb. 4, 2020, now Pat. No. 11,817,689, which is a continuation of application No. 14/546,626, filed on Nov. 18, 2014, now Pat. No. 10,574,044.

(51) Int. Cl.
| | |
|---|---|
| *H02G 3/08* | (2006.01) |
| *H02G 3/10* | (2006.01) |
| *H02G 3/16* | (2006.01) |

(52) U.S. Cl.
CPC ............... *H02G 3/088* (2013.01); *H02G 3/08* (2013.01); *H02G 3/081* (2013.01); *H02G 3/10* (2013.01); *H02G 3/16* (2013.01)

(58) Field of Classification Search
CPC ...................................... H02G 3/088

USPC ........................................... 174/53
See application file for complete search history.

(56) References Cited

U.S. PATENT DOCUMENTS

| | | | | |
|---|---|---|---|---|
| 3,439,108 | A | * | 4/1969 | Zerwes .............. H01R 13/5213 |
| | | | | 174/53 |
| 3,686,425 | A | | 8/1972 | Zerwes |
| 4,772,215 | A | | 9/1988 | Falk |
| 5,073,120 | A | | 12/1991 | Lincoln |
| 5,171,939 | A | | 12/1992 | Shotey |
| 5,967,354 | A | * | 10/1999 | Whitehead ............. H02G 3/185 |
| | | | | 220/3.7 |
| 6,179,634 | B1 | | 1/2001 | Hull |
| 6,608,253 | B1 | | 8/2003 | Rintz |

(Continued)

OTHER PUBLICATIONS

Canadian Office Action dated May 4, 2022, which issued in the corresponding Canadian Patent Application No. 2,968,231.

(Continued)

*Primary Examiner* — Stanley Tso
(74) *Attorney, Agent, or Firm* — Dickinson Wright PLLC

(57) ABSTRACT

An electrical assembly is constructed for mounting an electrical wiring device at an incline with respect to a support. The assembly includes a mounting bracket for receiving and supporting the electrical wiring device. The mounting bracket is received in a recess open end of a support, such as the open end of an adapter for an electrical box. The mounting bracket is coupled directly to the support. A weatherproof cover overlies the electrical wiring device and the bracket for closing the electrical wiring device and providing a weatherproof seal between the cover and the support.

27 Claims, 9 Drawing Sheets

(56)                    References Cited

U.S. PATENT DOCUMENTS

| | | | |
|---|---|---|---|
| 7,479,598 B1* | 1/2009 | Shotey ..................... | H02G 3/14 |
| | | | 33/528 |
| 7,709,735 B2 | 5/2010 | Vigorito et al. | |
| 8,575,484 B1 | 11/2013 | Witherbee | |
| 2004/0051648 A1 | 3/2004 | Hagarty | |
| 2005/0280032 A1 | 12/2005 | Hutter, III | |
| 2009/0078442 A1* | 3/2009 | Lin ........................ | H02G 3/121 |
| | | | 174/50.51 |
| 2010/0051309 A1 | 3/2010 | Dinh | |
| 2011/0226506 A1* | 9/2011 | Hamilton ............. | H05K 5/0017 |
| | | | 174/59 |
| 2011/0232957 A1 | 9/2011 | Gretz | |
| 2012/0031640 A1 | 2/2012 | Karcz | |
| 2013/0042539 A1 | 2/2013 | Burns | |
| 2014/0139047 A1 | 5/2014 | Haines | |
| 2014/0262418 A1 | 9/2014 | Korcz et al. | |

OTHER PUBLICATIONS

International Search Report issued in counterpart Patent Application
No. PCT/US15/60997, dated Dec. 28, 2015.

* cited by examiner

WATERTIGHT BOX AND ADAPTER

This application is a continuation application of U.S. application Ser. No. 16/781,679, filed on Feb. 4, 2020, which is a continuation of U.S. application Ser. No. 14/546,626, filed on Nov. 18, 2014, now U.S. Pat. No. 10,574,044, issued on Feb. 25, 2020, which is hereby incorporated by reference in its entirety.

FIELD OF THE INVENTION

The present invention relates generally to an electrical box and cover assembly for an electrical wiring device. The invention is particularly directed to an adapter for fitting into the open end of an electrical box or into the open end of an adapter member for supporting the electrical wiring device and a cover.

BACKGROUND OF THE INVENTION

Electrical connectors for use in locations having potentially hazardous atmospheres are often made so that any exposed electrical components which are being brought into mechanical contact with each other are not energized until after the physical contact has been completed. For this purpose, it is desirable to provide a switch, in a sealed chamber, within the connector/receptacle and to arrange the switch so that it can be closed only after the components have been joined. Connectors for this general purpose have been devised previously. However, such connectors can be complicated and therefore rather expensive to produce.

Numerous examples of weatherproof covers are known in the art. The weatherproof covers can have a housing that surround the electrical device, such a duplex receptacle or switch, and a lid or cover hinged to the housing to access the electrical device. Weatherproof covers for outside use must satisfy certain requirements for protecting the electrical device from water, dirt and the like. The cover is typically constructed to close by gravity when in use. Many of the weatherproof covers are constructed for mounting in either a horizontal position or a vertical position.

Weatherproof covers are also constructed so that the lid or closure member is spring biased to close by the force of the spring to ensure proper water protection of the electrical device. The weatherproof covers can be constructed for mounting directly to an electrical box to fit around the electrical device while allowing access to the electrical device by a pivotally mounted lid.

Other electrical devices are constructed as an integral unit for outside use. These devices generally have a housing forming a base with the electrical device mounted within the housing. A hinged cover is attached to the housing for accessing the electrical device. These electrical devices can constructed for attaching directly to a wall or other support.

One example of a weatherproof electrical device is disclosed in U.S. Pat. No. 4,772,215 to Falk. The electrical device includes a housing for mounting to an electrical box. The housing has base with screw holes for receiving the coupling screws to attach the housing to the electrical box. The open end of the housing for accessing the electrical device is oriented at an incline with respect to the base so that the open faces in a downward direction when the device is mounted on a vertical surface to shed water away from the open end. A cover is hinged to the housing and closed by a spring to protect the electrical device from rainwater.

While the prior devices are generally suitable for the intended purpose, there is a continuing need in the industry for improved wiring devices.

SUMMARY OF THE INVENTION

The present invention is directed to an electrical wiring device assembly and to a weatherproof cover assembly. The invention is further directed to an assembly for mounting an electrical wiring device to an electrical box or to a support surface.

The electrical wiring device assembly of the invention in one embodiment is configured for mounting an electrical device to a non-metallic electrical box. The invention is particularly directed to an assembly for mounting the electrical device at an inclined angle with respect to the open end of the electrical box or mounting surface.

One feature of the invention is to provide an electrical assembly that can be easily attached to an electrical box during mounting and assembly of the electrical device.

Another aspect of the invention is to provide an electrical device assembly having a cover member that can be coupled to an electrical box or to an adapter attached to the electrical box. The adapter enables the cover to be mounted at an incline with respect to the electrical box.

In one embodiment of the invention, the electrical assembly includes a cover and an adapter for mounting the cover to an electrical box. The adapter has a bottom edge for coupling to the open end of the electrical box and an open top end for accessing the electrical device. In one embodiment of the invention, the open top end of the adapter is oriented at an inclined angle with respect to the bottom end for angling and positioning the electrical device and the open end of the cover at an incline with respect to the electrical box or mounting surface.

The adapter has a substantially planar bottom end for coupling to the electrical box. The top end of the adapter has an inclined substantially flat surface with an opening for receiving the electrical device and mounting the electrical device at an inclined angle with respect to the bottom end of the adapter. A cover with a hinged lid is coupled to the adapter to close the top end and enclose the electrical device.

In one embodiment of the invention, the adapter includes a mounting bracket for supporting the electrical device. The mounting bracket can be coupled to the top end of the adapter by one or more fasteners. The electrical device is coupled to and supported by the mounting bracket. The mounting bracket can be mounted in the open top end of the adapter and recessed to sit below a top edge of the adapter. A gasket is typically positioned between the top end of the adapter and the bottom end of the cover to form a watertight seal. A gasket can also be positioned between the bottom end of the adapter and the open end of the electrical box or support surface of the assembly to form a weatherproof enclosure.

The features of the invention are basically attained by providing an electrical box assembly including an adapter and an electrical box. The electrical box has a bottom end and an open top end. The adapter has a bottom end coupled to the open top end of the electrical box and an open top end configured for supporting an electrical wiring device and a cover at an inclined angle with respect to the plane of the open top end of the electrical box.

The features of the invention are also attained by providing an electrical box assembly including an electrical box, and adapter, a mounting bracket having a ground strap, an electrical wiring device, and a cover. The electrical box has a bottom end, an open top end and at least one wire inlet. The adapter has an open bottom end coupled to the open top end of the electrical box. An open top end of the adapter is oriented at an inclined angle with respect to a plane of the open bottom end of the adapter. The mounting bracket is recessed in the open top end of the adapter and coupled to the adapter. The mounting bracket has a central opening with the ground strap integrally formed with an inner edge of the central opening and extending into the adapter. The electrical wiring device is received in the central opening and coupled to the mounting bracket. A cover having an access opening for the electrical device is coupled to the mounting bracket or to the electrical wiring device.

The various features of the invention are also attained by providing and electrical box assembly having an electrical box, a mounting bracket, an electrical wiring device, a cover and a gasket. The electrical box has a bottom end configured for coupling to a mounting surface. An open top end has an inwardly extending ledge defining a recess with a plurality of screw holes. The mounting bracket is received in the recess and coupled to the electrical box by screws threaded into the screw holes in the ledge of the electrical box. The bracket has a central opening, a first end portion with a threaded aperture and a second end portion with a threaded aperture. The electrical wiring device is received in the central opening of the mounting bracket and coupled directly to the mounting bracket. The cover has a central opening with a dimension to receive the electrical wiring device and is coupled to the mounting bracket or to the electrical wiring device. The gasket is positioned between the cover and the electrical box.

These and other features of the invention will become apparent from the following detailed description of the invention and the annexed drawings showing various embodiments of the invention.

BRIEF DESCRIPTION OF THE DRAWINGS

The following is a brief description of the drawings, in which.

DETAILED DESCRIPTION OF THE INVENTION

The invention is directed to an electrical assembly for mounting an electrical device in the open end of a support. The invention is particularly directed to an electrical assembly having an adapter for attaching to a support or electrical box and supporting an electrical wiring device at an angle with respect to the electrical box or support.

Figure 1:
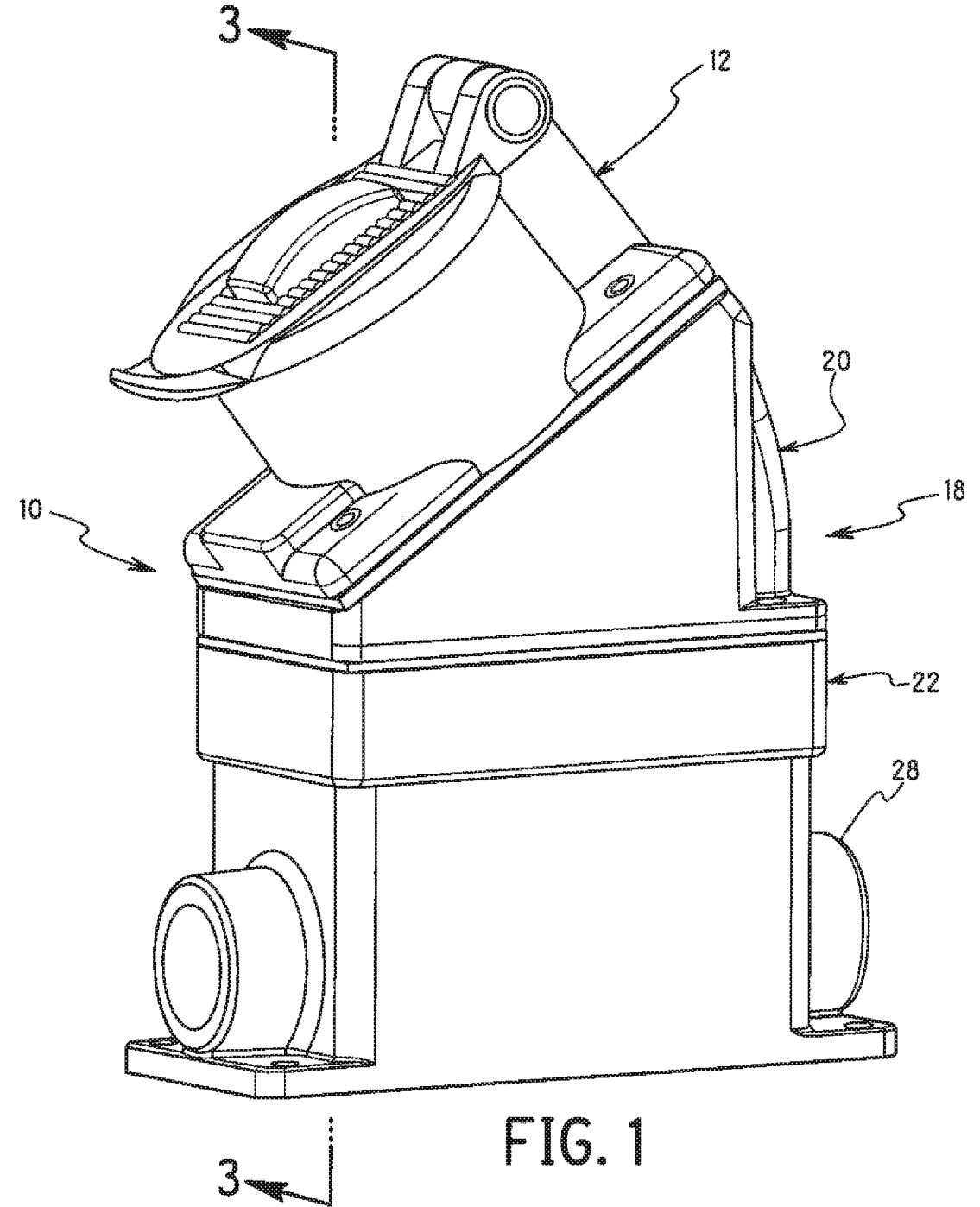
FIG. 1 is a perspective view of the electrical assembly in one embodiment of the invention.

The electrical assembly 10 of the invention is particularly suitable for supporting a weatherproof cover 12 where the assembly 10 includes a mounting bracket 14 for supporting and coupling an electrical wiring device 16 to a support 18 capable of supporting and mounting the electrical device 16 and the cover 12. The support 18 in the embodiment of the invention can be an adapter 20. As shown in FIG. 1, the adapter 20 is coupled to an electrical box 22, which together form the support 18. In other embodiments, the support 18 can be an electrical box without the use of the adapter 20.

The electrical box 22 in the embodiment shown is a nonmetallic box made of molded plastic material. The electrical box 22 has a base 24 with a plurality of screw holes 26 for receiving mounting screws and mounting the electrical box to a support structure. At least one wire access coupling 28 is provided for feeding wires to the electrical box 22. The wire access coupling 28 is typically configured for coupling with a conduit for supplying wiring to the electrical device 16. In the embodiment shown, the electrical box 22 has a coupling 28 extending from opposite ends. In other embodiments, the electrical box 22 can include other suitable access ports or openings for supplying electrical wiring to the wiring device 16.

Figure 2:
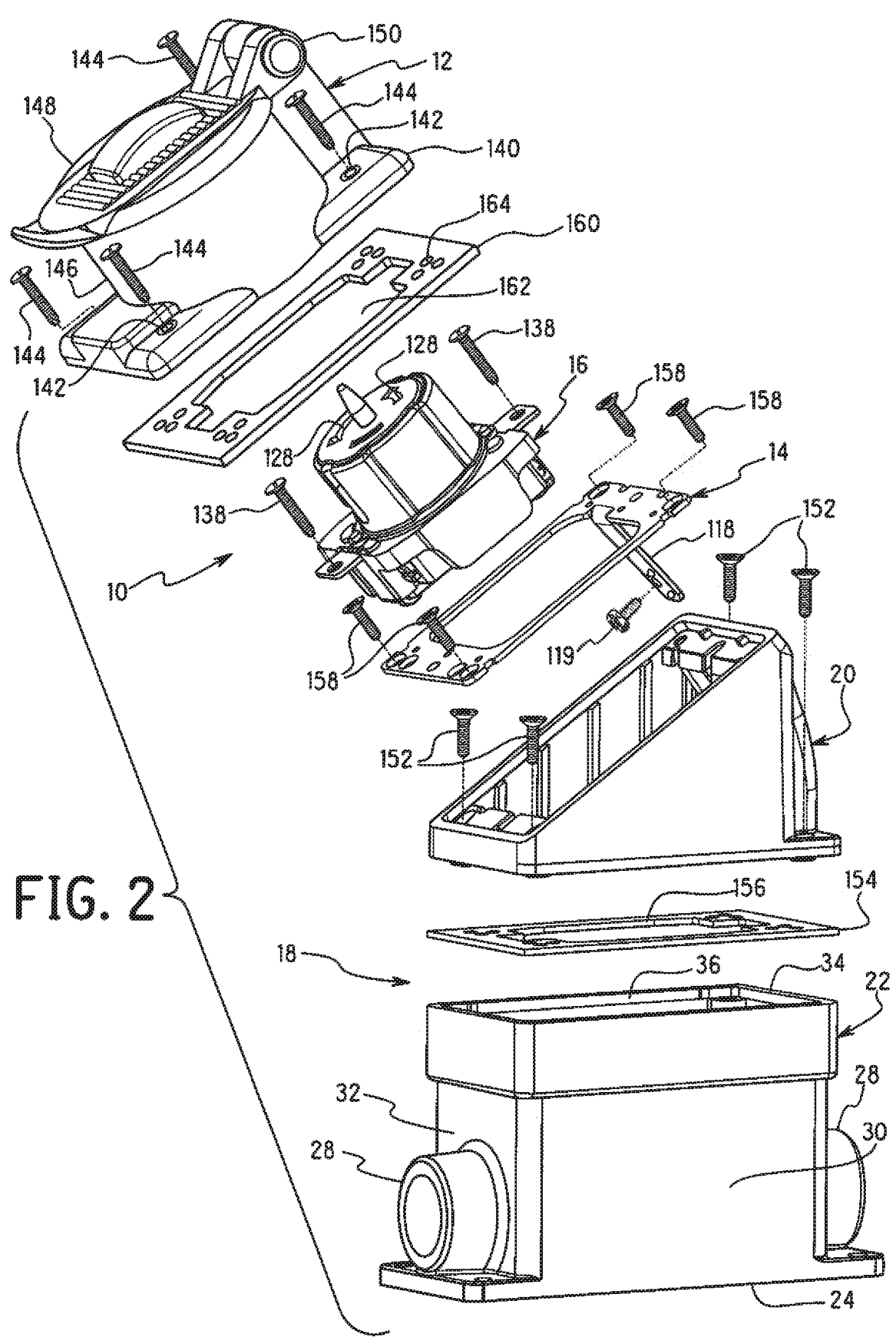
FIG. 2 is an exploded perspective view of the electrical wiring device of FIG. 1.
Figure 4:
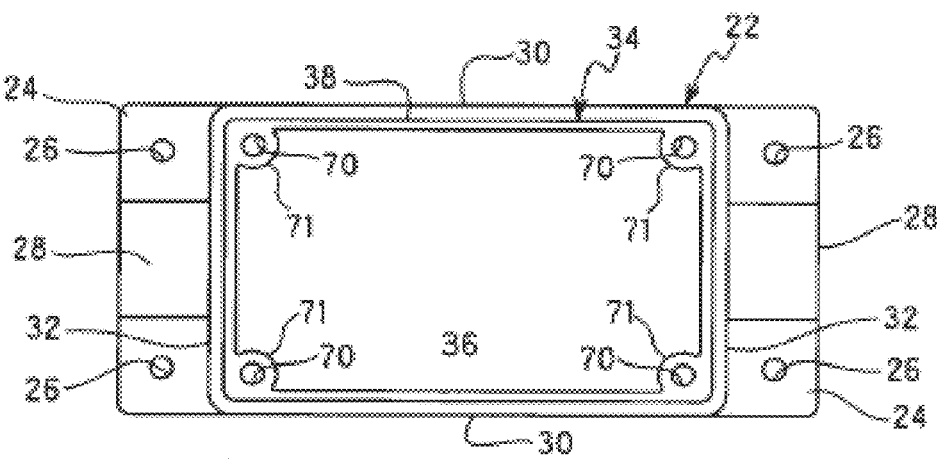
FIG. 4 is a top view of the electrical box in one embodiment of this invention.

In the embodiment shown, the electrical box 22 has a substantially rectangular configuration and has a dimension for supporting a single electrical device. In other embodiments, the electrical box 22 can be a multi-gang electrical box capable of supporting a plurality of electrical devices. The electrical box 22 includes side walls 30 and end walls 32 extending upwardly from the base 24 to an open top end 34 as shown in FIG. 2 and FIG. 4. An internal ledge 36 shown in FIG. 4 is formed on the inner face of the side walls 30 and end walls 32 spaced inwardly from a top edge 38. The ledge 36 forms a shoulder and preferably has a planar surface around the open top end 34 to form a continuous surface with a dimension for supporting the mounting bracket 14. In other embodiments, the ledge 36 can be discontinuous, such as by providing a shoulder at opposite ends of the electrical box. In the embodiment shown in FIG. 4, screw holes 70 are provided for receiving the mounting screws of the adapter 20.

The electrical box as shown is a non-metallic FS or FD box. In other embodiments, the electrical box can be a metal box with inwardly extending flanges or tabs having screw holes for mounting the electrical device and cover.

The adapter 20 has a bottom end 40 with a substantially planar surface for mating with the electrical box 22 and a top end 42 for receiving the electrical device 16 and the cover 12. In the embodiment shown, the top end 42 is formed at an inclined angle with respect to the bottom end 40. The top end 42 can be formed at an angle of about 50-60°, and typically about 45°, relative to the bottom end 40 for positioning the cover 12 and the electrical device 16 at an inclined angle relative to the bottom end 40 and the electrical box 22 or other support surfaces.

Figures 5, 6, 7:
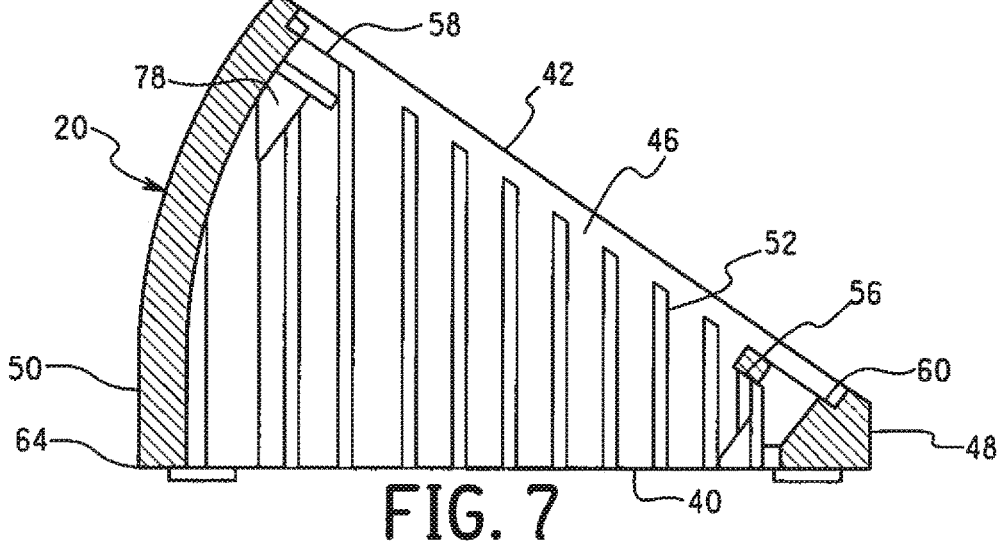
FIG. 5 is a side view of the adapter of the electrical assembly.
FIG. 6 is a top perspective view of the of the adapter of the electrical assembly.
FIG. 7 is a cross-sectional side view of the adapter taken along line 7-7 of FIG. 6.
Figure 8:
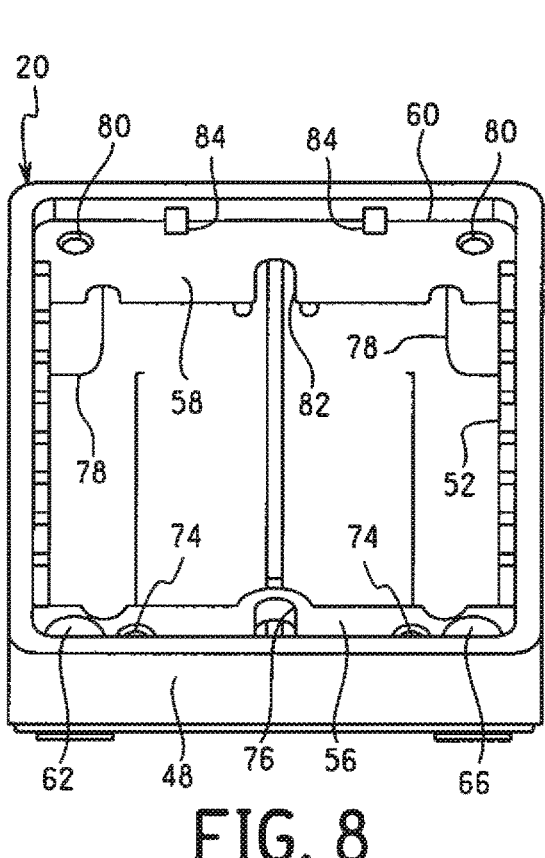
FIG. 8 is a front elevational view of the adapter of the electrical assembly.

The bottom end 40 and the top end 42 of the adapter 20 are open to define an internal cavity 44 for receiving the electrical device 16. The adapter 20 is formed as a one piece, integrally molded unit for mounting the electrical device 16 and the cover 12 at an inclined angle relative to the top end 34 of the electrical box 22. The adapter is formed by opposite side walls 42, a first end wall 48 and a second end wall 50. As shown in FIG. 7, the first end wall 48 has a height substantially less than the height of the second end wall 50 to define the inclined top end 42. In the embodiment shown, the second end wall 50 has a curved shape although in other embodiments, the end wall 50 can be substantially straight extending perpendicular to the plane of the bottom end 40.

The inner surfaces of the side walls 46 are provided with a plurality of longitudinally extending reinforcing ribs 52. The side walls 46, the first end wall 48 and the second end wall 50 define a central opening 54 for receiving and supporting the electrical wiring device 16. The first end wall 48 has an inwardly extending supporting ledge 56. The second end wall 50 has an inwardly extending supporting ledge 58. The supporting ledge 56 and the supporting ledge 58 are recessed with respect to the top edge 42 to form the recess 60 as shown in FIG. 6 and FIG. 7.

Referring to FIGS. 1 and 5-7, the adapter 20 includes screw apertures 62 formed in flanges at the rear edge 64 of the second end wall 50 at the opposite corners of the adapter for receiving coupling screws for coupling the adapter to the electrical box. Screw apertures 66 are provided at a rear edge 68 of the first end wall 48 and spaced inwardly from the top edge 42 and are positioned within the central opening 54 and the first ledge 56. The screw apertures 62 and screw apertures 66 are oriented with respect to the corresponding screw apertures 70 formed in a screw boss 71 in the electrical box 22 as shown in FIG. 4 for mounting the adapter 20 to the electrical box 22. The screw apertures 70 of the electrical box 22 also can be formed in flanges or tabs that extend inwardly from the walls of the electrical box. The screw apertures 62 are spaced outwardly with respect to the central opening 54 and the screw aperture 66 are positioned within the central opening 54 corresponding to the location of the screw apertures 70 in the electrical box 22.

The first ledge 56 of the adapter 20 includes a pair of screw bosses 72 having a screw hole 74 facing outwardly with respect to the central opening 54 and the plane of the open top end 42 of the adapter 20. A centrally located aperture 76 is formed in the first ledge 56 to define a clearance hole to accommodate a mounting screw of the electrical device as discussed hereinafter in detail.

The second ledge 58 also includes a pair of inwardly extending screw bosses 78 with an outwardly facing screw hole 80. An open U-shaped recess 82 forms a clearance hole to receive the mounting screw of the electrical device. Inwardly extending tabs 84 are provided on the outer face of the second ledge 82 and extends inwardly with respect to the end wall as shown in FIG. 6 and FIG. 7. In the embodiment shown, the screw holes 80 are spaced outwardly with respect to the screw holes 74. The screw holes 74 and 80 can be configured to receive self-threading screws or can be provided with internal threads.

Figure 9:
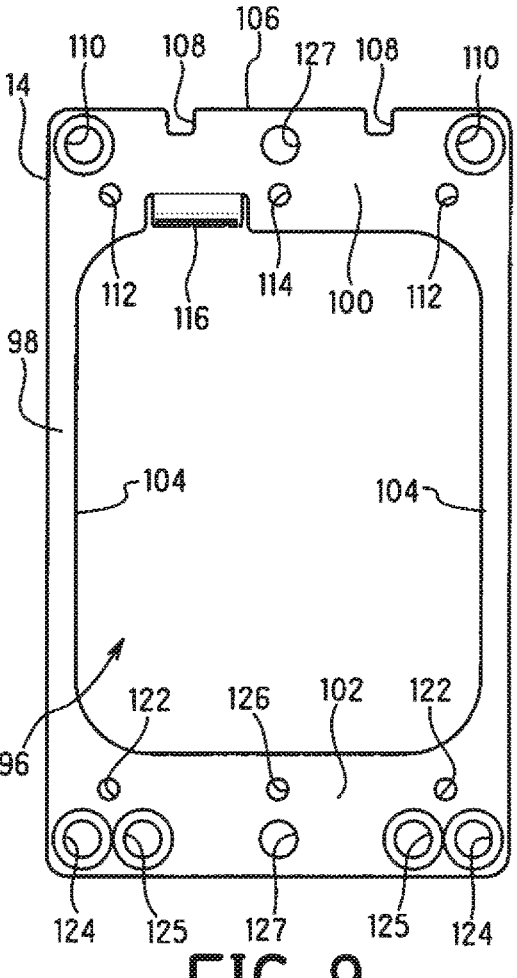
FIG. 9 is a top plan view of the mounting bracket of the electrical assembly.
Figure 10:
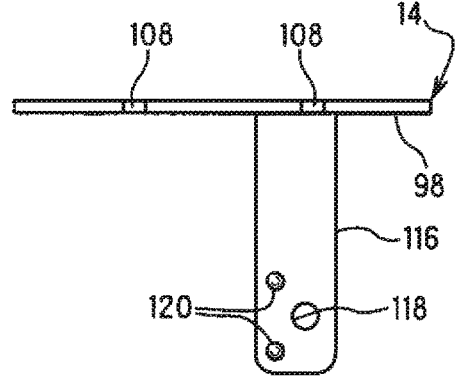
FIG. 10 is a front elevational view of the mounting bracket of the electrical assembly.
Figure 11:
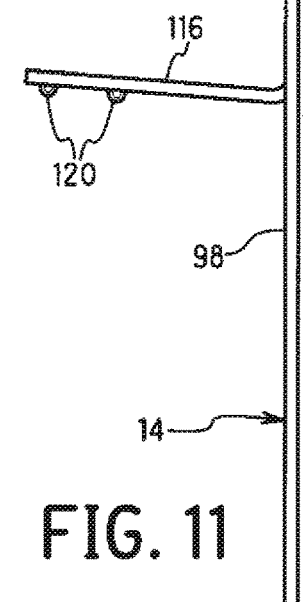
FIG. 11 is a side view of the mounting bracket.
Figure 15:
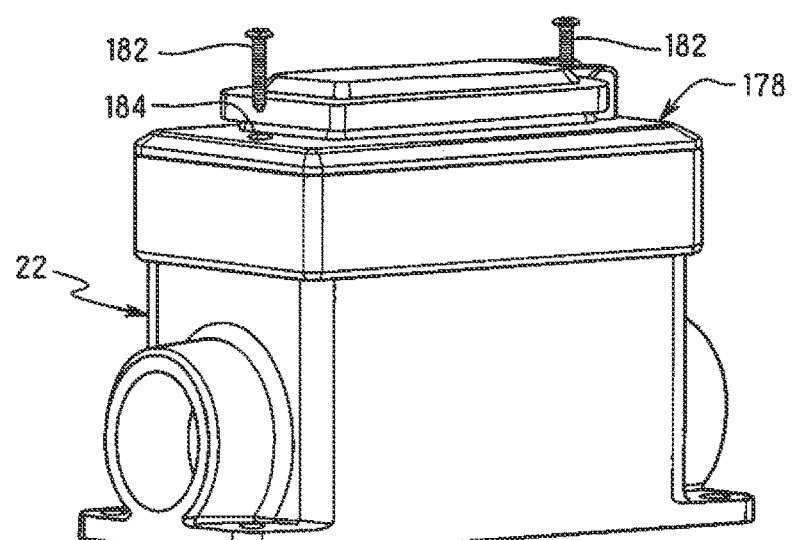
FIG. 15 is a perspective view of the electrical assembly in another embodiment of the invention.

The mounting bracket 14 is constructed for being received within the central opening 58 of the adapter 20 as shown in FIG. 2 and for fitting within the central opening of the electrical box 22 as shown in FIG. 15. The mounting bracket 14 as shown in FIGS. 9-11 has a substantially planar configuration with a central opening 96 defining a frame 98 surrounding the central opening 96. As shown in FIG. 9, the frame 98 includes end portions 100 and 102 and side portions 104 extending between the end portions 100 and 102. The central opening 96 has a dimension for receiving the electrical wiring device 16 as shown in FIG. 2. The mounting bracket 14 is able to mount various electrical wiring devices and is able to couple directly to the adapter 20 or to the open end and of the electrical box 22.

The end portion 100 of the mounting bracket 14 includes an outer edge 106 having spaced apart notches 108 for mating with the tabs 84 extending inwardly from the end of the adapter 20. The end portion 100 includes screw holes 110 having a beveled edge for receiving the coupling screws for coupling the mounting bracket 14 to the adapter 20. The screw holes 110 are oriented to align with the screw holes in the edge of the adapter. Threaded screw holes 112 are provided next to the side portions 104 for receiving mounting screws for coupling the cover to the mounting bracket 14. A threaded central screw hole 114 is included for receiving the mounting screw for mounting the electrical wiring device to the bracket.

In the embodiment shown in FIG. 11, the end portion 100 of the mounting bracket 14 includes a ground strap 116 extending from the inner edge of the central opening 96 and extending away from the plane of the frame 98. In one embodiment, the ground strap 116 is integrally formed with the frame 98 of the mounting bracket and bent outwardly from the plane of the frame to extend into the cavity of the adapter 20. The ground strap 116 includes a threaded hole 118 for receiving a coupling screw 119 for coupling a ground wire. Raised embossed dimples 120 are provided next to the threaded hole 118 for containing wire strands.

Figure 16:
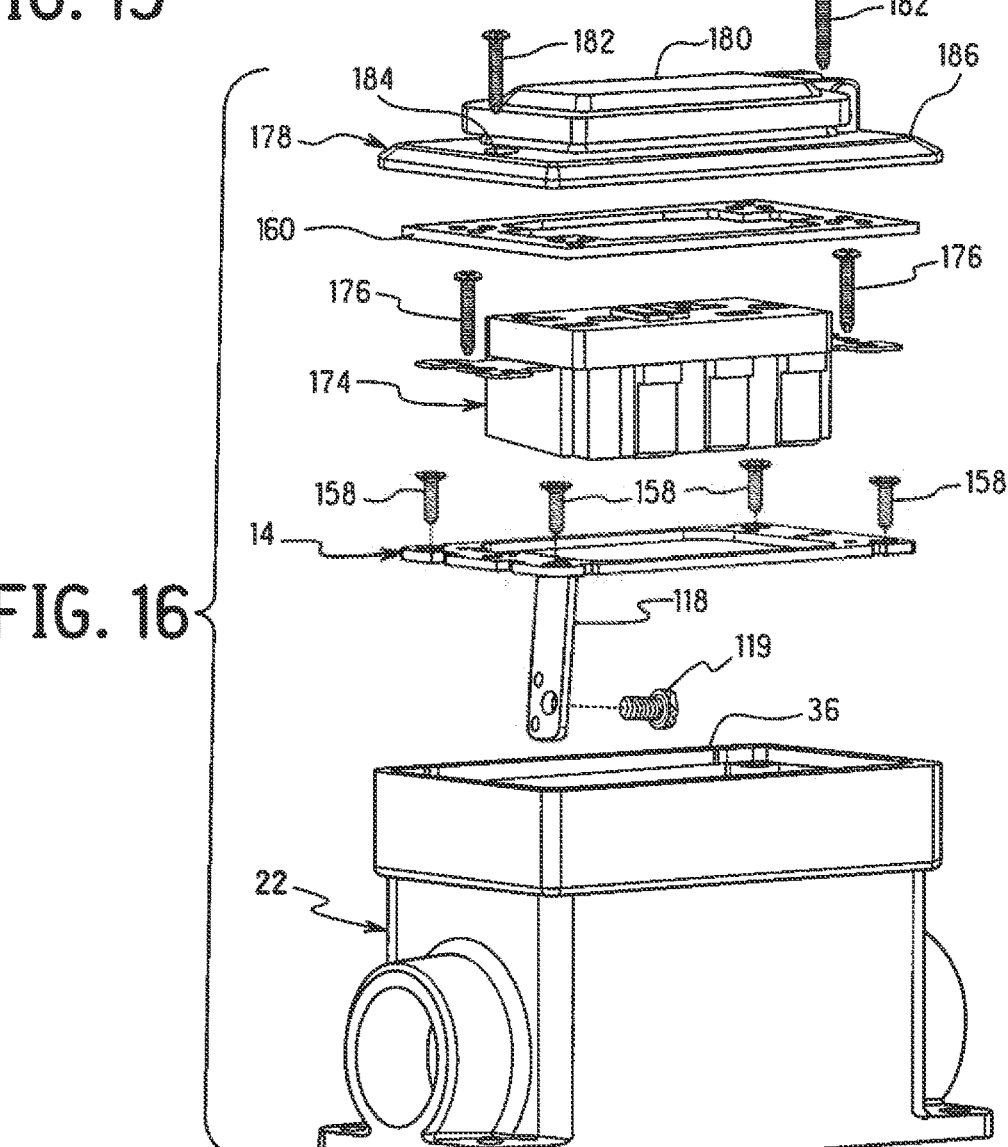
FIG. 16 is an exploded view of the electrical assembly of FIG. 15.

The end portion 102 of the mounting bracket 14 is oriented opposite the end portion 100 and includes threaded screw holes 122 for receiving the mounting screws of the cover 12. Beveled screw holes 124 are provided at the outer edges for receiving mounting screws for coupling the bracket 14 to the electrical box as shown in the embodiment of FIG. 15. Spaced inwardly from the beveled screw holes 124 are beveled screw holes 125 for receiving coupling screws for coupling the mounting bracket 14 to the adapter 20. As shown in FIG. 9, the screw holes 125 are oriented to align with the screw holes 74 of the adapter 20. A centrally located threaded screw hole 126 is provided for receiving the mounting screw of the electrical device. Clearance holes 127 are formed in the end portions 100 and 102 for receiving screws 182 from the cover 178 as shown in FIG. 16.

The electrical wiring device 16 in the embodiment shown is an electrical receptacle having a plurality of blade apertures 128. As shown, the electrical wiring device 16 has a body 130 with electrical contacts 132 for connecting to the electrical supply wires. A mounting strap 134 extends outwardly from opposite ends of the body 130 and includes a screw hole 136 for receiving a mounting screw 138 for coupling the electrical wiring device 16 to the mounting bracket 14.

The cover 12 in the embodiment shown is a waterproof cover for coupling to the adapter 20 and providing access to the electrical wiring device 16. The cover 12 includes a base 140 having screw holes 142 for receiving the mounting screws 144 and coupling the cover to the adapter 20. The screws 144 are threaded into the threaded holes 112 and 122 in the bracket 14. In the embodiment shown, the cover 20 includes a cylindrical body 46 having an open end for accessing the electrical wiring device 16. A lid 148 is hinged to the cylindrical body 146 to pivot between an open and closed position allowing access to the electrical wiring device 16. The lid 148 is coupled to the cylindrical body 46 by a hinge member 150 to pivot outwardly to the open position. In one embodiment, the lid 148 is spring biased to the closed position so that the lid closes when not in use to provide a waterproof cover for the electrical wiring device.

Figure 3:
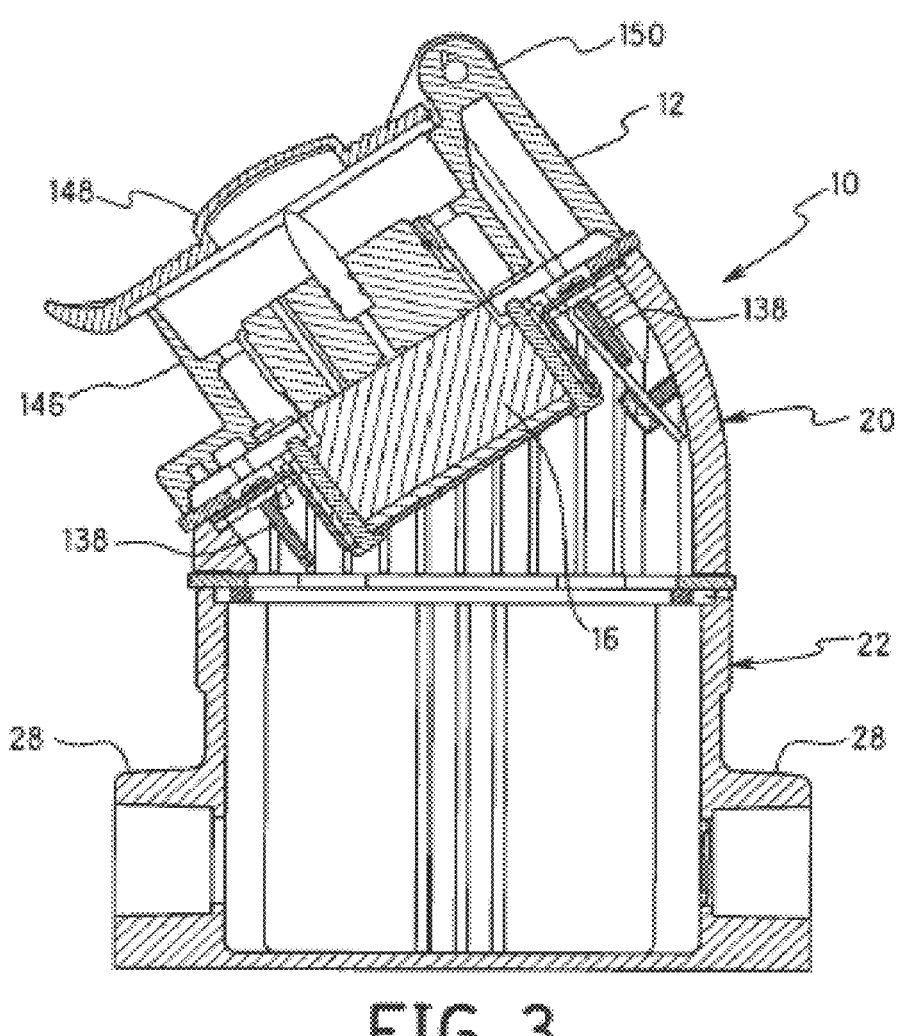
FIG. 3 is a cross-sectional side view of the electrical assembly taken along line 3-3 of FIG. 1.

In the embodiment of FIGS. 1-3, the adapter 20 is coupled to the open end of the electrical box 16 by screws 152 extending through the corresponding screw apertures in the adapter and threaded into the screw holes in the electrical box. The screws 152 can be self-threading screws. In the embodiment shown, a gasket 154 is positioned between the electrical box 22 and the adapter 20 to provide a waterproof connection between the adapter 20 and the electrical box 22. The gasket 154 has a central opening 156 for connecting the wires from the electrical box to the electrical device 16. The gasket 154 also includes appropriate clearance holes for receiving the mounting screws that pass through the gasket for coupling the adapter 20 to the electrical box 22.

In the embodiment shown, the electrical wiring device 16 is coupled directly to the mounting bracket 14 by the screws 138. The screws 138 are threaded into the central threaded holes 114 and 126. Screws 158 pass through the corresponding apertures in the mounting bracket 14 and are threaded into the screw holes 74 and 80 in the adapter 20 for coupling the mounting bracket 14 directly to the adapter 20. The screws 158 can be self-threading screws. A gasket 160 is positioned over the mounting bracket 14 on the top edge of the adapter 20. The gasket 160 includes a central opening 162 for receiving the electrical wiring device. Clearance holes are positioned for allowing the mounting screws 144 of the cover 12 to pass through the gasket and thread into the screw holes 112 and 122 in the mounting bracket 14. The cover 12 is then positioned over the electrical wiring device 16 and gasket 160 and the screws 144 pass through the screw holes 142 in the base 140 of the cover and threaded into the threaded screw holes in the mounting bracket 14.

In the embodiment of FIGS. 1-3, adapter 20 is coupled directly to the open end of the electrical box 16. The electrical box is typically mounted in a vertical orientation such as on a vertical wall or support structure. The adapter 20 is coupled to the open end of the electrical box with the open top end of the adapter facing in a generally downward direction at an angle of about 50-60° and preferably about 55° with respect to the vertical structure. The downward direction of the open top end of the adapter reduces the risk of rain water from entering the open end of the cover during use.

Figure 12:
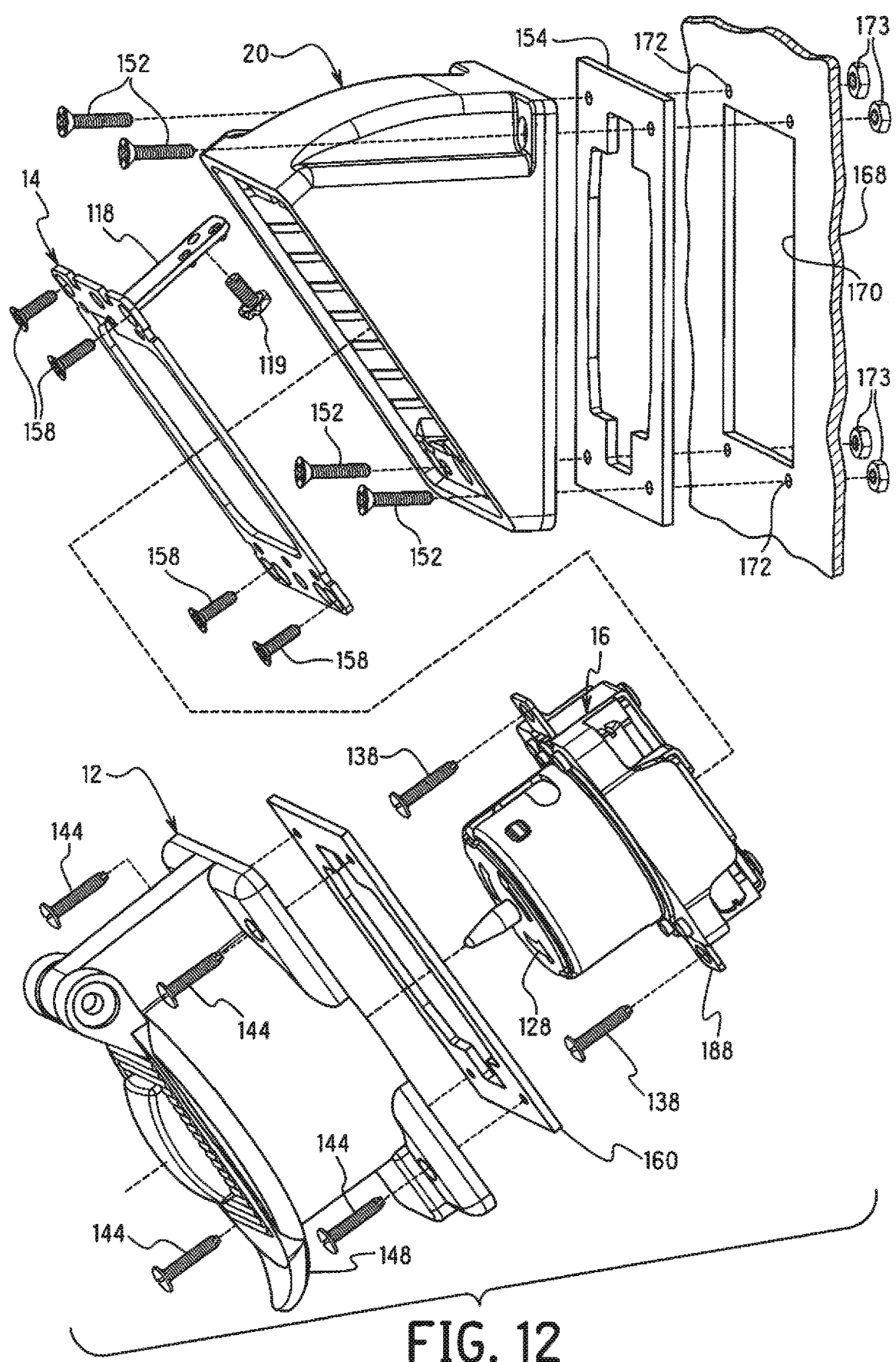
FIG. 12 is an exploded perspective view of the electrical assembly in a second embodiment of the invention.
Figure 13:
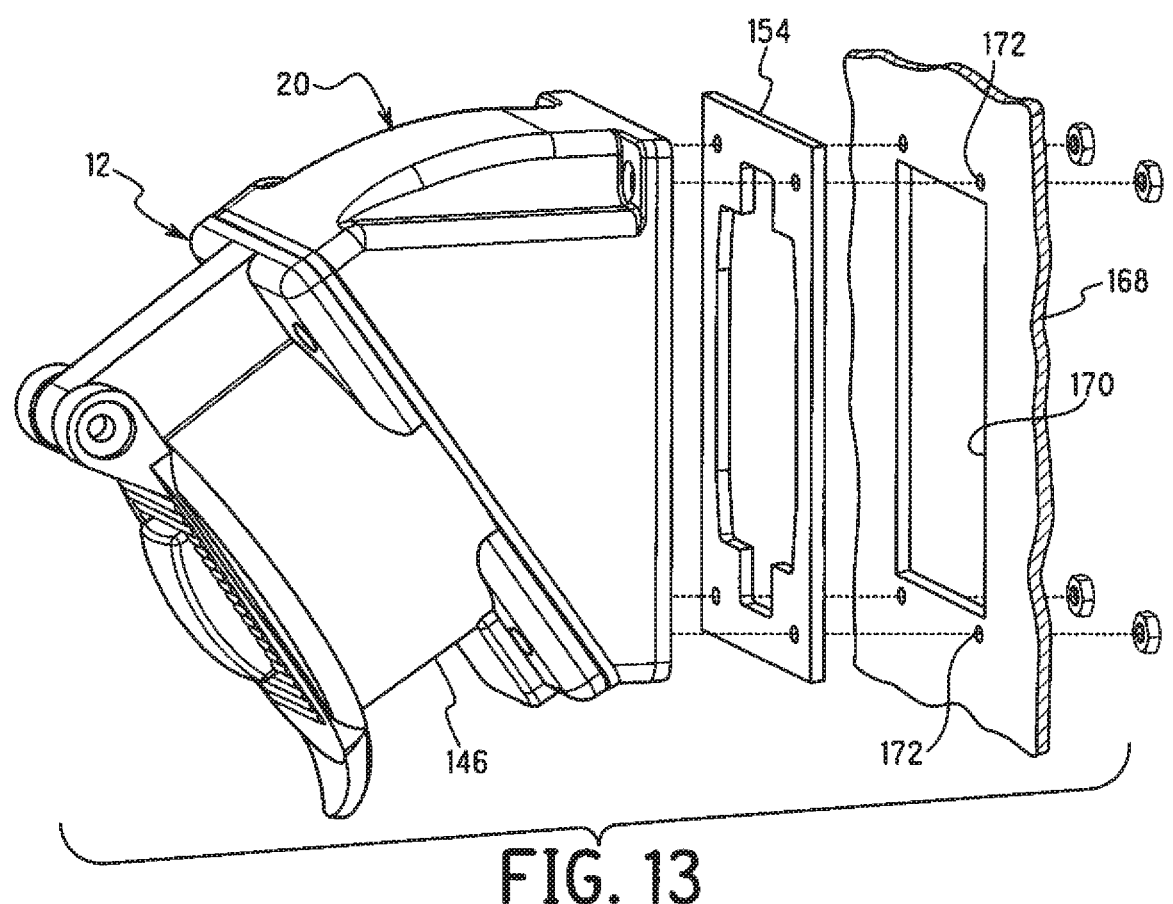
FIG. 13 is a perspective view of the electrical assembly of FIG. 12 showing the cover member coupled to the adapter.
Figure 14:
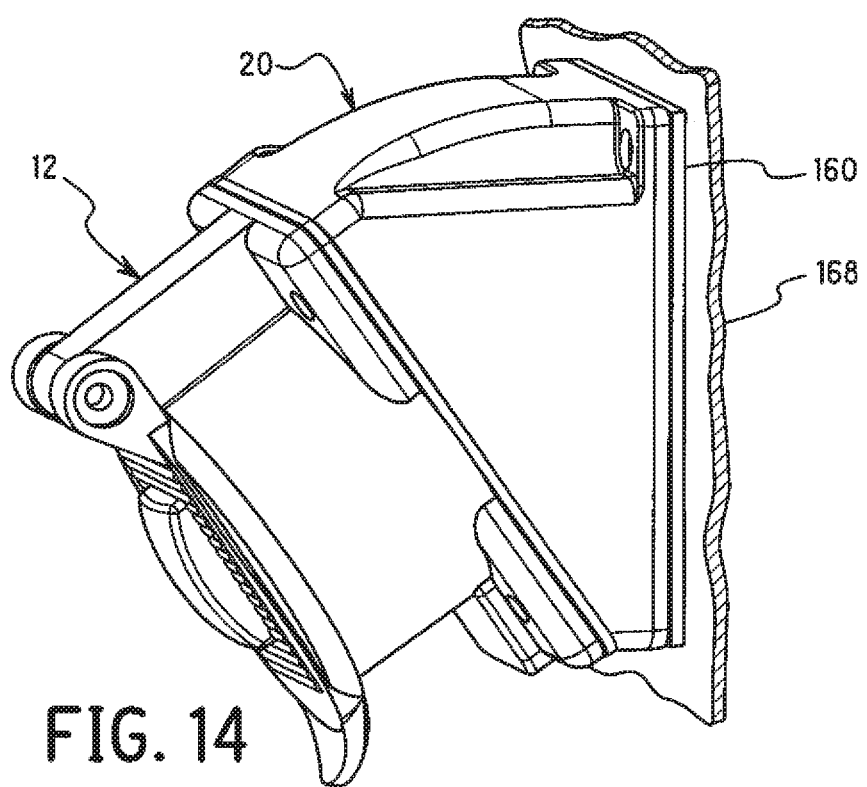
FIG. 14 is a perspective view of the electrical assembly of FIG. 12 mounted to a wall.

In another embodiment shown in FIGS. 12-14, the adapter 20 is mounted directly to a vertical structure 168 without the use of the electrical box. In the embodiment shown, the vertical structure 168 is a wall having an access opening 170 for supplying wires to the electrical wiring device. The mounting screws 152 for the adapter 20 are placed through screw holes 172 in the vertical structure 168 and retained by nuts 173 as shown in FIG. 12. As shown in FIG. 12, the gasket is positioned between the bottom end of the adapter and the vertical structure 168 so that the open top end of the adapter and the open end of the cover are directed in a generally downward direction with respect to the vertical structure 168.

Figures 17, 18:
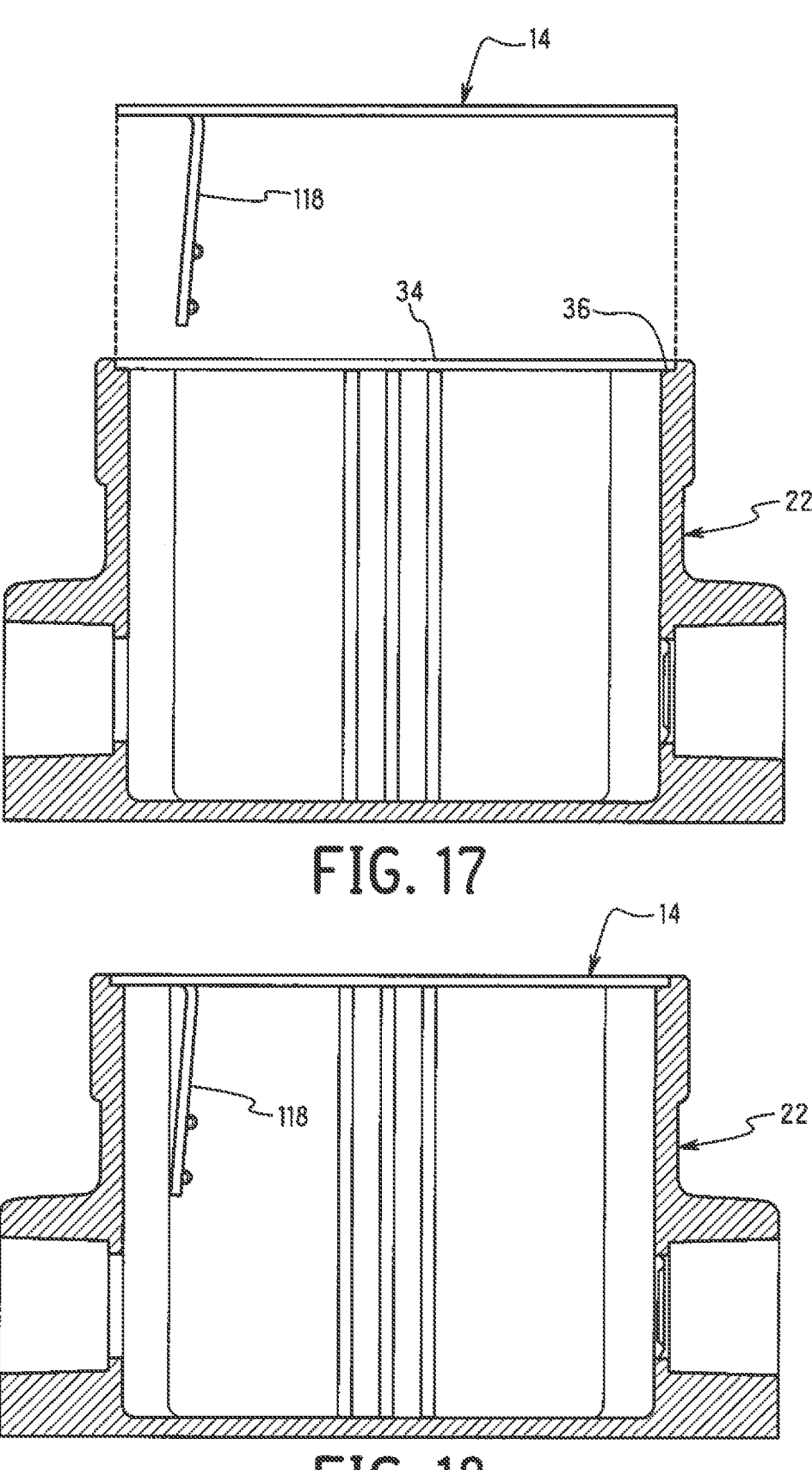
FIG. 17 is an exploded cross-sectional side view of the mounting bracket and electrical box.
FIG. 18 is a partial cross-sectional side view showing the mounting bracket mounted in the open end of the electrical box.

In another embodiment shown in FIGS. 15-18, the mounting bracket 14 is coupled directly to the open end of the electrical box 22. As shown in FIG. 18, the mounting bracket 14 is received in the recess in the open end of the electrical box 22 so that the top face of the mounting bracket 14 is substantially flush with the top edge of the electrical box 22. In the embodiment shown in FIGS. 15-18, the electrical wiring device is a GFCI duplex receptacle 174 attached directly to the mounting bracket 14 by coupling screws 176. The gasket is positioned over the receptacle 174 to fit on the open top end of the electrical box 22. The cover 178 includes a central opening for accessing the receptacle 174 and a hinged lid 180. The coupling screws 182 extend through a corresponding screw aperture 184 in the base 186 of the cover 178. The coupling screws 182 in this embodiment are screwed into threaded screw holes in the mounting strap 188 of the receptacle. In other embodiments, the cover can have four coupling screws which can couple with the mounting bracket as in the embodiment of FIGS. 1-3.

Although only a few embodiments of the present invention are shown and described, the present invention is not limited to the described embodiments. Instead, it will be appreciated by those skilled in the art that changes may be made to these embodiments without departing from the principles and spirit of the invention. It is particularly noted that those skilled in the art can readily combine the various technical aspects of the various elements of the various exemplary embodiments that have been described above in numerous other ways, all of which are considered to be within the scope of the invention, which is defined by the appended claims and their equivalents.

What is claimed is:

1. An electrical assembly comprising:
a support configured for coupling to an electrical box, said support having a two opposite side walls and two opposite end walls that define an internal cavity having a bottom end and a top end that are open in which to receive an electrical wiring device, and a support surface spaced from the top end of said support;
a mounting bracket received on said support surface and positioned in said internal cavity and coupled by a fastener to said support surface within said cavity, where said mounting bracket is configured to support an electrical wiring device provided within said cavity of said support; and
a cover having a base with an opening, and a movable lid coupled to said base to close said opening in said base, and where said base is directly coupled to said mounting bracket by a fastener extending between said base and mounting bracket,
wherein the two opposite end walls of the support comprise a first end wall and a second end, the second end wall having a height less than a height of the first end wall such that the two opposite side walls extending between the first end wall and the second end wall each has a top edge that is inclined to define the top end oriented in a first plane that is inclined relative to a second plane in which the bottom end is oriented, the second plane of the bottom end being parallel to a top end of the electrical box, the mounting bracket coupled to the support being correspondingly inclined relative to the top end of the electrical box.

2. The electrical assembly of claim 1, wherein said support further comprises an electrical box and an adapter coupled to said electrical box, and where adapter comprises said support surface forming a recess for supporting said mounting bracket and electrical wiring device in an open top end of said adapter.

3. The electrical assembly of claim 2, wherein said mounting bracket has an outer dimension to be received in said recess.

4. The electrical assembly of claim 1, wherein said support has an inwardly extending ledge defining said support surface.

5. The electrical assembly of claim 1, wherein said electrical wiring device is separate from said mounting bracket and coupled to said mounting bracket by a fastener.

6. The electrical assembly of claim 5, wherein said mounting bracket comprises a peripheral frame defining an opening, and a ground strap integrally formed with an inner edge of said peripheral frame.

7. The electrical assembly of claim 1, wherein said mounting bracket is coupled to said support and said electrical wiring device is coupled to said mounting bracket.

8. The electrical assembly of claim 1, wherein a first end of said mounting bracket has a threaded screw hole and a second end of said mounting bracket has a threaded screw hole, and where said electrical wiring device has a mounting screw threaded into said threaded screw holes of said mounting bracket.

9. The electrical assembly of claim 1, wherein the base of the cover comprises at least one hole for receiving a coupling screw as said fastener, said mounting bracket having at least one threaded hole for receiving the coupling screw passing through the corresponding hole in said base for coupling the base and cover to the mounting bracket.

10. The electrical assembly of claim 1, wherein the support is formed as one piece that is integrally molded.

11. The electrical assembly of claim 1, wherein the fastener comprises at least one threaded screw, and the mounting bracket and the support surface each comprises at least one screw hole to receive the at least one threaded screw to fixedly couple the mounting bracket to the support surface.

12. An electrical assembly comprising:

an electrical box having a top end;

a cover;

an adapter having two opposite side walls and two opposite end walls that define an internal cavity having an open top end and an open bottom end in which to receive an electrical device, the open bottom end of the adapter being coupled to said top end of said electrical box, the two opposite end walls comprising a first end wall and a second end, the second end wall having a height less than a height of the first end wall such that the two opposite side walls extending between the first end wall and the second end wall each has a top edge that is inclined to define the open top end oriented in a first plane that is inclined relative to a second plane in which the open bottom end is oriented, the second plane of the open bottom end being parallel to said top end of the electrical box, and a mounting bracket having an outer peripheral edge and a central opening for receiving an electrical device, and where the electrical device is coupled to said mounting bracket, and where said mounting bracket is received in and directly coupled to said adapter by a fastener, the mounting bracket coupled to said adapter being in the first plane and correspondingly inclined relative to the top end of the electrical box;

wherein the cover has a bottom end coupled to said mounting bracket via another fastener and has a top end oriented in the first plane to be inclined with respect to the second plane that is parallel of said top end of said electrical box.

13. The electrical assembly of claim 12, wherein said adapter has an inwardly extending ledge spaced from the top end and forming a recess at said top end of said adapter, and where said mounting bracket is received in said recess of said adapter and coupled to said ledge.

14. The electrical assembly of claim 12, wherein said mounting bracket has a grounding strap integrally formed with an inner edge of a central opening of said mounting bracket and extends inwardly into said cavity of said adapter.

15. The electrical assembly of claim 12, wherein said mounting bracket has a first end with at least one hole for receiving the fastener for coupling the first end of the mounting bracket to the adapter, said mounting bracket having a second end with at least one hole for receiving another fastener for coupling the second end of the mounting bracket to the adapter.

16. The electrical assembly of claim 12, wherein said mounting bracket has a plurality of threaded holes for receiving a threaded fastener of said electrical device for coupling the electrical device to the mounting bracket.

17. The electrical assembly of claim 16, wherein the bottom end of the cover has a base with a plurality of holes configured for receiving a coupling screw as said another fastener, and where said mounting bracket has a plurality of threaded holes configured for receiving the coupling screw for coupling said cover to said mounting bracket.

18. The electrical assembly of claim 12, further comprising a first waterproof gasket positioned between said bottom end of said adapter and said top end of said electrical box; and a second waterproof gasket positioned between said cover and said top end of said adapter and between said mounting bracket and said cover.

19. The electrical assembly of claim 12, wherein the fastener comprises at least one threaded screw, and the mounting bracket and the adapter each comprises at least one screw hole to receive the at least one threaded screw to fixedly couple the mounting bracket to the adapter.

20. An electrical assembly comprising:

an adapter coupled to a top end of an electrical box, said adapter having two opposite side walls and two opposite end walls that define an internal cavity having an open top end and an open bottom end in which to receive an electrical wiring device, the two opposite end walls comprising a first end wall and a second end, the second end wall having a height less than a height of the first end wall such that the two opposite side walls extending between the first end wall and the second end wall each has a top edge that is inclined to define said open top end oriented in a first plane that is inclined relative to a second plane in which said open bottom end is oriented, the second plane of said open bottom end being parallel to said top end of the electrical box, and an inwardly extending ledge spaced from said open top end a distance to define a recess within the internal cavity of said adapter;

a mounting bracket having an outer edge received in said recess and an inner edge defining an opening;

an electrical wiring device received in said opening of said mounting bracket and coupled to said mounting bracket;

a fastener to couple the mounting bracket to at least one of the adapter and the electrical box, the mounting bracket being in the first plane and correspondingly inclined relative to said top end of the electrical box when coupled to the at least one of the adapter and the electrical box; and a cover, said mounting bracket having a plurality of threaded holes for receiving screws extending through said cover and coupling said cover to said mounting bracket.

21. The electrical assembly of claim 20, wherein said mounting bracket has a plurality of holes, and said ledge of said adapter has a plurality of threaded holes receiving a coupling screw for coupling said mounting bracket to said adapter.

22. The electrical assembly of claim 20, wherein said open top end of said adapter has a top edge, said inwardly extending ledge comprising a first ledge at a first end of said adapter and a second ledge at a second end of said adapter, the first end and the second end chosen from any of the two opposite sides walls and the two opposite end walls; and said first ledge and second ledge being spaced inwardly from said top edge a distance to define said recess complementing a thickness of said mounting bracket.

23. The electrical assembly of claim 20, wherein said mounting bracket has a frame surrounding said central opening for receiving said electrical wiring device, a first end with a threaded screw hole and a second end with a threaded screw hole, each said threaded screw hole receiving a coupling screw of the electrical wiring device for coupling the electrical wiring device directly to said mounting bracket.

24. The electrical assembly of claim 20, further comprising a cover having a base with an outer dimension corresponding to an outer dimension of said adapter and greater than an outer dimension of said recess in said adapter, whereby said mounting bracket is enclosed in said recess between said adapter and said base of said cover.

25. The electrical assembly of claim 20, wherein said ledge on said adapter comprises a first ledge extending inwardly from a first end of said adapter, and a second ledge extending inwardly from a second end of said adapter, the first end and the second end chosen from any of the two opposite sides walls and the two opposite end walls; and wherein said first ledge includes a first aperture oriented for receiving a screw for coupling said adapter to said electrical box, and said second ledge has an aperture for receiving a screw for coupling said adapter to the electrical box.

26. The electrical assembly of claim 20, wherein said recess in said adapter has a depth where said mounting bracket is received completely in said recess.

27. The electrical assembly of claim 20, wherein the fastener is at least one threaded screw, and said mounting bracket has at least one hole and said ledge of said adapter has at least one threaded hole that each receive the at least one threaded screw to couple said mounting bracket to said adapter.

* * * * *